United States Patent [19]

Mattson

[11] Patent Number: 4,664,028

[45] Date of Patent: May 12, 1987

[54] APPARATUS FOR ADDING LIQUID POLOXALENE TO FEEDS

[75] Inventor: David Mattson, Overland Park, Kans.

[73] Assignee: Farmland Industries, Inc., Kansas City, Mo.

[21] Appl. No.: 753,895

[22] Filed: Jul. 11, 1985

[51] Int. Cl.⁴ .......................... A23K 3/00; B02B 7/02; B01F 15/02

[52] U.S. Cl. ....................................... 99/487; 99/534; 366/141; 366/182; 366/603

[58] Field of Search ................. 99/467, 468, 485, 486, 99/487, 516, 534; 366/167, 168, 173, 141, 603, 182; 222/650, 43

[56] References Cited

U.S. PATENT DOCUMENTS 2,553,788  5/1951  Richardson et al. ................ 99/487

Primary Examiner—Timothy F. Simone

Attorney, Agent, or Firm—Schmidt, Johnson, Hovey & Williams

[57] ABSTRACT

A shipping drum containing liquid poloxalene is supported in tilted orientation on a platform scale, and a spigot at the lower end of the drum is operable to cause the poloxalene to flow through piping means and into a pressure vessel. The platform scale provides indication of the amounts of poloxalane received by the vessel. Subsequently, the vessel is sealed and pressurized to approximately 50–60 psi whereupon a valve is opened so that the poloxalene is directed out of the vessel and into a conduit means. A plurality of discharge orifices disposed in the conduit means overlie a dry feed mixer, and the mixer is operable to constantly agitate a quantity of solid carrier such as a vitamin and mineral supplement or, alternatively, a grain such as cracked corn or milo. The mixer provides relative motion between all of the carrier granules and the discharge orifices so that the poloxalene is evenly distributed over substantially all surfaces of the granules.

7 Claims, 1 Drawing Figure

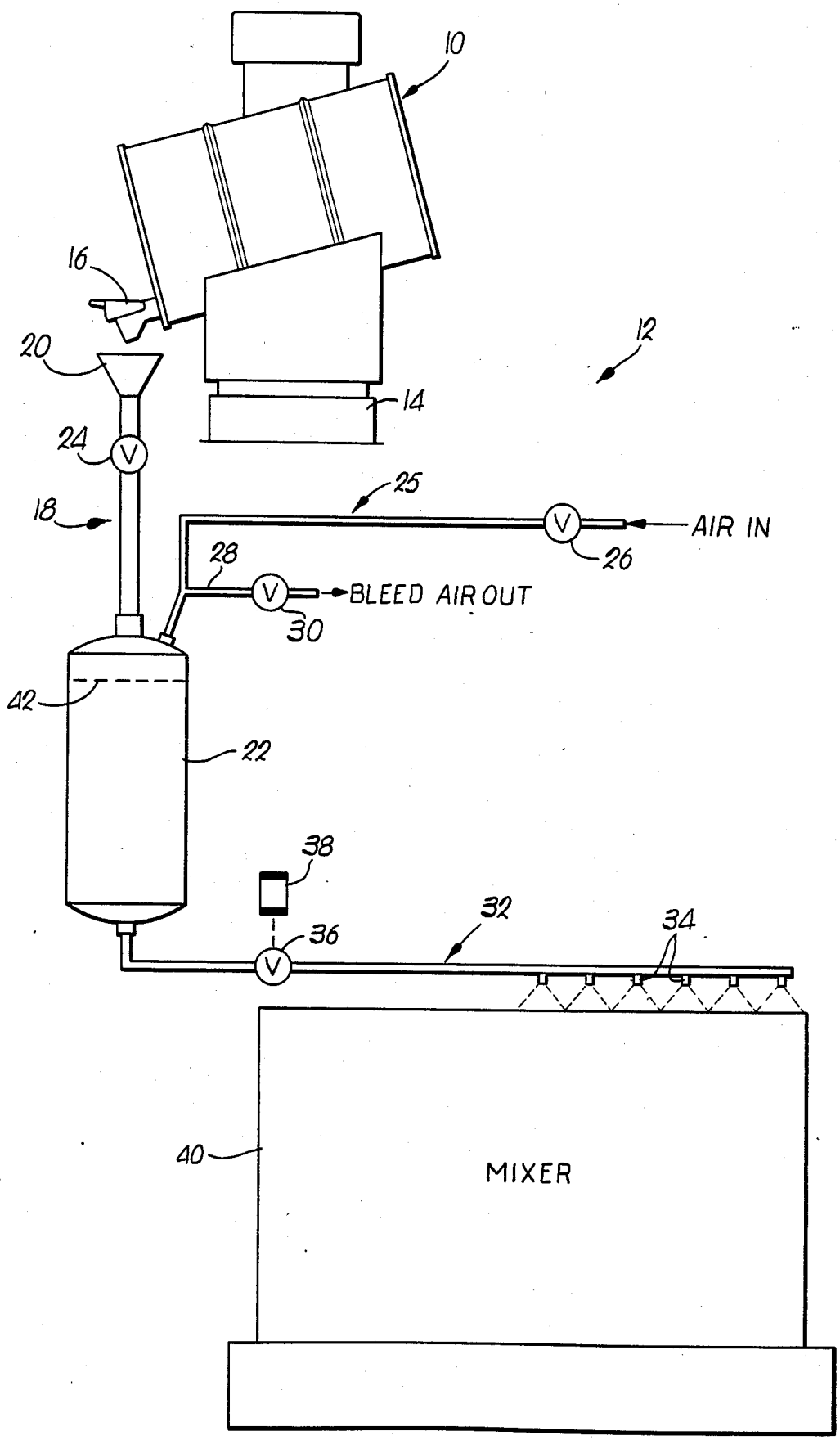

APPARATUS FOR ADDING LIQUID POLOXALENE TO FEEDS

BACKGROUND OF THE INVENTION

1. Field of the Invention

This invention relates to a method and apparatus for adding a relatively viscous liquid bloat suppressing agent such as poloxalene to granular animal feeds. The apparatus includes a vessel operable to pressurize and spray the poloxalene toward a continuously agitated quantity of the dry feed.

2. Description of the Prior Art

Bloat is a disorder which affects ruminant livestock, particularly grazing cattle and sheep during the spring season when pastures of wheat or the like are lush. The seriousness of the condition is underscored by the fact that an animal can become afflicted and experience abdominal distension, severe respiratory distress, prostration and even death within a period of ten or fifteen minutes after affliction unless treatment is given. Furthermore, bloat is often sporadic in nature and can occur without warning; yet, constant surveillance over a herd of grazing animals is not feasible under normal conditions.

In recent years, the use of poloxalene for the prevention of bloat has become increasingly widespread. In U.S. Pat. No. 3,465,083 to Bartley, et al., a poloxalene preparation is disclosed comprising a polyoxypropylene-polyoxyethylene polymer having an average total molecular weight of substantially 2,850 to 3,150, and the polymer is characterized by containing about 33% by weight of polyoxyethylene together with about 67% by weight of polyoxypropylene. Such a formulation is sold under the tradename "Bloat Guard" by SmithKline Corporation, Philadelphia, Pa.

As with any medication, sufficient precautions should be undertaken to insure that each of the animals receives the correct indicated dosage of poloxalene each time the latter is to be administered. For example, an undersized dose can fail to sufficiently protect against bloat whereby further complications may be rapidly and unexpectedly encountered. On the other hand, an administered dose that is larger than indicated can pose hazards either for the animal or for the ultimate human consumer of the animal, and furthermore such an excessive dosage can be economically wasteful.

Typically, poloxalene is mixed with a carrier such as a grain product or nutramineral so that the medication may be conveniently administered on a regular basis. Poloxalene is available in either solid or liquid form, and the agriculturalist may choose the solid, granular formulation due to the relative ease of mixing the dry poloxalene with grains or other food products. However, substantial costs savings can be realized by purchasing poloxalene as a liquid in large, 450 pound shipping containers or drums.

Unfortunately, substantial difficulties are encountered when attempting to uniformly mix a quantity of viscous liquid poloxalene with a solid carrier such as grains or nutraminerals. In occasional past practice, an electric pump was connected to the shipping drum in an attempt to pump the poloxalene to a dry feed mixer, and a volume displacement meter was utilized in an effort to monitor the quantity of poloxalene added to the field. However, the electric pump must, by necessity, be relatively expensive due to the high viscosity of the liquid poloxalene. Moreover, the volume displacement meter is often inaccurate and frequently must be repaired.

SUMMARY OF THE INVENTION

The present invention overcomes the disadvantages of the prior art by utilization of a novel method and apparatus for uniform distribution of poloxalene over the outer surfaces of a granular animal feed. The apparatus as disclosed herein is inexpensive yet is highly effective to insure that a correct oral dosage of poloxalene is satisfactorily distributed over all of the granules.

In more detail, the apparatus includes a weight scale for measuring a quantity of poloxalene removed from a shipping container or barrel, a pressure vessel for receiving the poloxalene from the barrel, and a source of pressurized air for selectively pressurizing the vessel. Additionally, a conduit means extends from the pressure vessel and includes a plurality of discharge orifices located in relative proximity to a quantity of dry, granular animal feed, the latter of which is retained in an agitated state by a dry feed mixer. After the air pressurizes the vessel, the air is operable to uniformly spray the poloxalene over the outer surfaces of the constantly stirred animal feed.

Advantageously, the weight scale supports the shipping container in tilted orientation so that an outlet of the container is operable to drain the entire contents of the container. A piping means interposed between the drum and the pressure vessel includes a valve which can be selectively closed to prohibit air leakage as the vessel is pressurized. Also, a bleed valve is coupled to the vessel so that the air within the vessel displaced by the incoming flow of poloxalene can escape.

BRIEF DESCRIPTION OF THE DRAWING

The drawing illustrates a preferred embodiment of the invention according to the best mode presently contemplated. The single drawing FIGURE illustrates a schematic diagram of the apparatus for adding liquid poloxalene to feeds, including the scale, piping means, pressure vessel, conduit means and dry feed mixer.

DETAILED DESCRIPTION OF THE PREFERRED EMBODIMENT

The drawing illustrates a shipping container or drum 10 for storing a quantity of liquid bloat suppressing agent such as poloxalene or the like. An apparatus, broadly designated by the numeral 12, provides a means for transferring the poloxalene from the drum 10 and subsequently adding the same uniformly to a solid carrier (not shown) such as a granular animal feed, nutramineral or the like.

More specifically, the apparatus 12 as shown schematically in the FIGURE includes a scale 14, and support means 15 mounts the drum 10 on the scale 14 and supports the drum 10 in a tilted orientation. As such, a spigot 16 connected to the lowermost portion of one end of the drum 10 is thus operable to effectively drain the entire poloxalene content from the drum 10 as desired. The scale 14 can be a platform scale whereby the weight of the quantity of poloxalene removed from the drum 10 can be calculated.

A piping means 18 communicates with the spigot 16 of the drum 10 and includes a funnel-shaped inlet 20 disposed in underlying relation to the outlet of the spigot 16. Remote from the inlet 20, the piping means 18 is coupled to an upright pressure vessel 22 for receiving poloxalene from the drum 10. Furthermore, the piping means 18 includes a valve 24 interposed between the inlet 20 and the vessel 22 for purposes which will hereinafter become apparent.

A means for selectively pressurizing the vessel 22 comprises a source of pressurized air 23 that is coupled to tubing 25 which is, in turn, connected to the upper end of the vessel 22. A valve 26 is disposed in the tubing 25 to selectively admit air from the pressurized air source 23. The tubing 25 also includes a branch line 28 having a valve 30 for providing a means for bleeding air out of the vessel 22 as poloxalene is received within the same.

A conduit means 32 is coupled to the lower end of the vessel 22 and includes a plurality of discharge orifices 34 remote from the vessel 22. Also, a valve 36 is disposed in the conduit means between the orifices 34 and the vessel 22, and the valve 36 can be remotely controlled by means of an electric solenoid 38.

A dry feed mixer 40 is disposed in underlying relation to the discharge orifices 34 of the conduit means 32. It has been found that a spiral ribbon mixer is particularly effective for the purposes disclosed herein. In a typical ribbon mixer, an outer ribbon pushes the feed in one direction while an inner ribbon pushes the feed in the opposite direction. However, other types of mixers, such as a paddle type mixer, are also equally effective for practice of the instant invention.

One example of a feed formulation is disclosed in the following Table I.

TABLE I

| % | Lb/Ton | Description |
|---|---|---|
| 17.90 | 358.00 | Dicalcium Phosphate (21%) |
| 15.25 | 305.00 | Mid-Sol-U-Lac (an alcohol byproduct for palatability and mineral regulation) |
| 13.15 | 263.00 | Ground Limestone |
| 12.50 | 250.00 | Milo |
| 10.00 | 200.00 | Wheat Middlings |
| 15.00 | 300.00 | Mixing Salt |
| 5.55 | 111.00 | Magnesium Oxide |
| 2.50 | 50.00 | Molasses, Dried |
| 1.75 | 35.00 | Cattle Fortifier 6852 (a vitamin and trace mineral mixture) |
| .90 | 18.00 | Vitamin A %30,000 GM |
| .50 | 10.00 | Iron Oxide |
| .50 | 10.00 | Bentonite |
| .10 | 2.00 | Dry Molasses Flavor |
| 4.40 | 88.00 | Liquid Poloxalene |

However, it is to be understood that the feed formulation listed in Table I is for illustrative purposes only, since poloxalene may also be added to other types of carriers such as cracked corn, silage or milo.

As is apparent from reference to Table I, large quantities of poloxalene must necessarily be well mixed with the remaining ingredients set out in Table I for proper dosage administration. Oftentimes, it is desirable to blend a three ton batch of the feed; however, such a quantity would call for 264 pounds of poloxalene to be uniformly added to the carrier. As can be appreciated, handling of such a quantity of viscous poloxalene can be difficult and time-consuming. Yet, it is of vital importance that the poloxalene be evenly mixed for absorption or adhesion uniformly upon all of the carrier granules so that each of the animals receives a proper quantity of the medication.

In use of the apparatus 12, the spigot 16 is opened and indicia on the scale 14 is observed until the desired amount of poloxalene is emptied from the drum 10 and into the funnel inlet 20 of the piping means 18 for subsequent transfer to the pressure vessel 22. If the feed formulation of Table I is followed for constructing a three ton batch, then 264 pounds of poloxalene should be transferred to the vessel 22 from the drum 10. In this regard, it should be noted that the drum 10 is a typical shipping container having walls of insufficient strength to withstand a pressure capable of spraying the poloxalene directly from the drum 10 for discharge through a nozzle or other orifice. In most instances, the walls of a common shipping drum can resist only approximately 15 psi.

It has been found that a vessel 22 having a capacity of 30 gallons is particularly effective for preparation of a three ton batch of medicated feed. As such, 264 pounds of poloxalene will partially fill the vessel 22 corresponding to a level indicated by the dashed line at 42. As the poloxalene is received within the vessel 22, the valve 30 is opened to allow air within the vessel 22 displaced by the poloxalene to escape.

After a sufficient amount of poloxalene is introduced into the vessel 22, the valves 24, 30 and 36 are closed and the valve 26 is opened to admit pressurized air into the vessel by means of the tubing 25. As should be obvious, the valves 24, 30 are operable to preclude leakage of air through the piping means 18 or the tubing 25, respectively. Preferably, the vessel 20 should be pressurized to about 50 or 60 psi.

Next, the dry, granular carrier is introduced into the mixer 40 and the latter is then actuated to retain the carrier in a constant, stirring motion. As noted hereinabove, the carrier may, by way of example, include the ingredients as recited in Table I with the exclusion of the liquid poloxalene. Alternatively, the carrier may be any other type of animal feed or may comprise a non-food substitute such as vermiculite.

Next, the valve 36 is opened by means of the solenoid 38 such that the pressurized air within the vessel 22 forces the poloxalene through the conduit means 32 for discharge through the orifices 34 toward the carrier. As a result, the relative motion between the orifices 34 and the carrier within the mixer 40 insures that as the poloxalene is sprayed from the orifices 34, the poloxalene is distributed generally uniformly over substantially all of the outer surfaces of the carrier.

The vessel 22 is of sufficient strength to withstand rupturing as the same is pressurized to a degree capable of overcoming the viscous forces presented by the poloxalene so that the latter can be easily and efficiently sprayed through the discharge orifices 34 and toward the animal feed. The solenoid 38 provides effective remote control of the operation so that the user may be freed to visually observe the work. After the vessel 20 has been substantially emptied, the pressurized air source 23 may be utilized to force out any poloxalene remaining in the conduit means 32.

At 25° C., poloxalene exhibits an absolute viscosity of 525 centipoise and has a specific gravity of 1.04. Consequently, the kinematic viscosity at the same temperature is 504.8 centistokes. It has been found that a pressure of approximately 50-60 psi within the vessel 22 is sufficient to force the poloxalene out of the discharge nozzles 34 as a stream or film. However, it is possible, and within the scope of the invention, to increase the pressure within the vessel 22 so that a spray is formed wherein discrete, microscopic drops of poloxalene are maintained dynamically in a dispersed state as the latter is discharged through the orifices 34.

I claim:

1. In combination:

a quantity of liquid material having a relatively high viscosity;

a shipping container having internal walls for storing said liquid material, said container having an end portion with an outlet;

scale means for measuring the weight of said shipping container including the weight of said liquid material stored by said container;

means mounting said shipping container on said scale means and for supporting said shipping container in an orientation wherein said outlet of said shipping container is positioned to enable gravity discharge of said quantity of liquid material from said shipping container;

piping means communicating with said outlet of said container;

a pressure vessel coupled to said piping means for receiving said quantity of liquid material as the same flows by gravity from said outlet of said shipping container and through said piping means;

means for selectively venting said pressure vessel for discharge of air from said vessel as said quantity of liquid material is introduced into the same, said scale means including means for determining the weight of said liquid material received by said pressure vessel;

means for selectively pressurizing said vessel with air;

conduit means coupled to said vessel and having a discharge orifice; and a quantity of granular animal feed disposed adjacent said discharge orifice, said internal walls of said container being rupturable when subjected to air pressurized to a degree sufficient for spraying said liquid material through said orifice, said internal walls of said vessel being of sufficient burst strength to withstand rupturing as said vessel is pressurized with air by said pressurizing means to a degree capable of overcoming the viscous forces presented by said quantity of said liquid material so that said liquid material can be sprayed through said discharge orifice and toward said animal feed.

2. The invention of claim 1, said piping means having a valve interposed between said shipping container and said vessel for preventing pressure loss through said piping means.

3. The invention of claim 1, said conduit means includes a solenoid valve disposed between said discharge orifice and said vessel for selectively interrupting spraying of said poloxalene as said vessel is pressurized.

4. The invention of claim 1; and including a means for providing relative movement between said discharge orifice and said animal feed whereby said quantity of poloxalene is generally uniformly distributed to said granular animal feed.

5. The invention of claim 4, wherein said means for providing relative movement comprises a dry feed mixer.

6. The invention of claim 5, wherein said mixer is a ribbon mixer.

7. The invention of claim 1, said measuring means comprising a scale having means for supporting said shipping container and being operable to provide the weight of said quantity of poloxalene removed from said container.

* * * * *